(12) United States Patent
Moskowitz

(10) Patent No.: US 12,351,448 B2
(45) Date of Patent: Jul. 8, 2025

(54) BEVERAGE DISPENSER WITH BEVERAGE-LEVEL INDICATOR

(71) Applicant: PepsiCo, Inc., Purchase, NY (US)

(72) Inventor: Steven Philip Moskowitz, North White Plains, NY (US)

(73) Assignee: PepsiCo, Inc., Purchase, NY (US)

( * ) Notice: Subject to any disclaimer, the term of this patent is extended or adjusted under 35 U.S.C. 154(b) by 251 days.

(21) Appl. No.: 18/050,889

(22) Filed: Oct. 28, 2022

(65) Prior Publication Data
US 2023/0102658 A1    Mar. 30, 2023

Related U.S. Application Data

(62) Division of application No. 16/509,317, filed on Jul. 11, 2019, now Pat. No. 11,511,984.

(51) Int. Cl.
*B67D 1/08*        (2006.01)
*G01F 23/22*     (2006.01)

(52) U.S. Cl.
CPC ........... *B67D 1/0878* (2013.01); *G01F 23/22* (2013.01)

(58) Field of Classification Search
CPC ............... B67D 1/0878; B67D 1/0005; B67D 1/1238; B67D 1/06; B67D 1/1256; B67D 1/0888; G01F 23/22; G01F 23/20; G01F 23/292; G01F 23/296; G01F 23/28; G01F 23/804; Y02W 30/80
See application file for complete search history.

(56) References Cited

U.S. PATENT DOCUMENTS

| | | | |
|---|---|---|---|
| 4,259,559 A | 3/1981 | Kondo et al. |
| 4,944,336 A | 7/1990 | Stembridge et al. |
| 6,227,265 B1 | 5/2001 | Skell et al. |
| 7,661,448 B2 | 2/2010 | Kim et al. |
| 8,245,735 B2 | 8/2012 | Chase et al. |

(Continued)

FOREIGN PATENT DOCUMENTS

| | | |
|---|---|---|
| JP | 2004-323063 A | 11/2004 |
| JP | 2019-070869 A | 5/2019 |

(Continued)

OTHER PUBLICATIONS

Extended European Search Report in European Patent Application No. 20837415.7, mailed Nov. 17, 2023 (20 pages).

(Continued)

*Primary Examiner* — Vishal Pancholi
(74) *Attorney, Agent, or Firm* — Sterne, Kessler, Goldstein & Fox P.L.L.C.

(57) ABSTRACT

A beverage dispenser having a beverage-level indicating system. The beverage dispenser includes a housing and a dispensing head arranged on the housing for dispensing a beverage into a beverage container. The beverage dispenser further includes a beverage-level sensor arranged on the housing and which determines a beverage level within the beverage container without contacting the beverage within the beverage container, a beverage-level indicator that provides a visual indication of the beverage level within the beverage container, and a control unit that causes the beverage-level indicator to indicate the beverage level within the beverage container based on the beverage level as determined by the beverage-level sensor.

20 Claims, 9 Drawing Sheets

(56) References Cited

U.S. PATENT DOCUMENTS

| | | |
|---|---|---|
| 11,511,984 B2 | 11/2022 | Moskowitz |
| 2003/0089423 A1* | 5/2003 | Barton ............... B67D 1/0888 141/198 |
| 2007/0227619 A1* | 10/2007 | Shiraishi ............ B67D 1/0034 141/95 |
| 2008/0216504 A1 | 9/2008 | Kim et al. |
| 2009/0183796 A1 | 7/2009 | Chase et al. |
| 2009/0194564 A1 | 8/2009 | Tsubouchi et al. |
| 2011/0192494 A1 | 8/2011 | Poulter |
| 2013/0008556 A1 | 1/2013 | Ashrafzadeh et al. |
| 2013/0096715 A1 | 4/2013 | Chung et al. |
| 2015/0046877 A1 | 2/2015 | Cuppari et al. |
| 2015/0144653 A1 | 5/2015 | Kline et al. |
| 2015/0157039 A1 | 6/2015 | Nosler et al. |
| 2016/0159632 A1 | 6/2016 | Wheatley et al. |
| 2016/0207753 A1 | 7/2016 | Choi et al. |
| 2016/0244311 A1 | 8/2016 | Burks et al. |
| 2017/0050834 A1 | 2/2017 | Beavis et al. |
| 2018/0072553 A1 | 3/2018 | Lyons et al. |
| 2019/0172297 A1 | 6/2019 | Schwarber et al. |

FOREIGN PATENT DOCUMENTS

| | | |
|---|---|---|
| JP | 2013-230853 A | 11/2023 |
| KR | 101901614 B1 | 9/2018 |
| KR | 2018/0109259 A | 10/2018 |
| WO | WO 2008/010454 A1 | 1/2008 |
| WO | 2008/138710 A1 | 11/2008 |
| WO | 2015/021309 A1 | 2/2015 |
| WO | 2018/140546 A1 | 8/2018 |

OTHER PUBLICATIONS

International Search Report and Written Opinion of the International Searching Authority in International Application No. PCT/US2020/039696, mailed Sep. 11, 2020 (12 pages).

Office Action and English Summary for Japanese Patent Application No. 2022-500842, dated Sep. 3, 2024; 6 pages.

* cited by examiner

BEVERAGE DISPENSER WITH BEVERAGE-LEVEL INDICATOR

CROSS-REFERENCE TO RELATED APPLICATIONS

The present application is a divisional application of U.S. application Ser. No. 16/506,317, filed Jul. 11, 2019, which is incorporated herein by reference in its entirety.

FIELD

Embodiments described herein generally relate to systems for indicating a level of a beverage within a beverage container. Specifically, embodiments described herein relate to a beverage dispenser that includes a beverage-level indicating system for providing a user with a visual indication of the beverage level within a container.

BACKGROUND

Reusable beverage containers are gaining popularity as an environmentally-friendly alternative to single-use plastic bottles. Reusable beverage containers provide other benefits over single-use plastic bottles, and in addition to being environmentally-friendly, reusable beverage containers may have a variety of colors, designs, and patterns that allow consumers to select a personalized beverage container. Further, reusable beverage containers may provide additional functionality and some containers include, for example, a handle, gripping portions, an ergonomic design, and may be double-walled or otherwise insulated to minimize heat transfer in order to keep beverages hot or cold.

BRIEF SUMMARY OF THE INVENTION

Some embodiments relate to a beverage dispenser that includes a housing and a dispensing head arranged on an upper end of the housing for dispensing a beverage into a beverage container. The beverage dispenser further includes a beverage-level sensor arranged on the housing and configured to determine a beverage level within the beverage container without contacting the beverage within the beverage container, a beverage-level indicator configured to provide a visual indication of the beverage level within the beverage container, and a control unit configured to cause the beverage-level indicator to indicate the beverage level within the beverage container based on the beverage level as determined by the beverage-level sensor.

Some embodiments relate to a beverage dispenser having a beverage-level indicating system that includes a housing and a dispensing head arranged on the housing for dispensing a beverage into a beverage container. The beverage dispenser further includes a beverage-level sensor arranged on the housing and configured to determine a beverage level of a beverage within the beverage container without contacting the beverage, and a control unit configured to communicate with a mobile electronic device, wherein the mobile electronic device is configured to provide an indication of the beverage level within the beverage container based on the beverage level as determined by the beverage-level sensor.

In any of the various embodiments discussed herein, the beverage-level sensor may be arranged on the dispensing head.

In any of the various embodiments discussed herein, the housing may include an overhang that defines a beverage container receiving area under the overhang, and the dispensing head may be arranged on the overhang.

In any of the various embodiments discussed herein, the beverage dispenser may further include a user interface configured to receive a beverage selection and cause dispensing of a beverage corresponding to the beverage selection. In some embodiments, the user interface may include a plurality of actuators for receiving the beverage selection. In some embodiments, the user interface may further include a selection indicator for each of the plurality of actuators, wherein the selection indicator indicates that an actuator of the plurality of actuators has been selected.

In any of the various embodiments discussed herein, the beverage-level indicator includes one or more lights arranged in a line. In some embodiments, the beverage dispenser does not include a display.

In any of the various embodiments discussed herein, the beverage-level indicator may continually display the beverage level within the beverage container as the beverage container is being filled by the dispensing head.

In any of the various embodiments discussed herein, the control unit may be configured to receive a beverage selection of a user from a mobile electronic device.

In any of the various embodiments discussed herein, the visual indication may include a beverage container representation displayed on a display of a mobile electronic device, and the beverage container representation is filled to a level that corresponds to the beverage level within the beverage container.

In any of the various embodiments discussed herein, the control unit may be configured to transmit a signal to the mobile electronic device such that the mobile electronic device produces an audible indication or a vibration.

Some embodiments relate to a method of indicating a level of a beverage within a beverage container that includes dispensing a beverage into a beverage container by a dispensing head of a beverage dispenser, determining an initial beverage level of the beverage within the beverage container by a beverage-level sensor of the beverage dispenser, and indicating visually to a consumer the initial beverage level of the beverage within the beverage container via a beverage-level indicator.

In any of the various embodiments discussed herein, the beverage-level indicator may include a plurality of lights arranged in a line that is parallel to a longitudinal axis of the beverage dispenser, and indicating the beverage level may include illuminating a light of the plurality of lights that is coplanar with the beverage level within the beverage container.

In any of the various embodiments discussed herein, the beverage-level indicator may include a digital display, and indicating the beverage level may include displaying a beverage container representation that is filled to a level that corresponds to the beverage level within the beverage container.

In any of the various embodiments discussed herein, determining the beverage level may include determining the beverage level without the beverage-level sensor contacting the beverage within the beverage container.

In any of the various embodiments discussed herein, a method of indicating a level of a beverage within a beverage container may include playing a sound by an audio device of the beverage dispenser when the beverage level within the beverage container reaches a predetermined beverage level as determined by the beverage-level sensor.

In any of the various embodiments discussed herein, indicating the beverage level may include transmitting a signal corresponding to the beverage level within the beverage container to a mobile electronic device, such that the mobile electronic device displays the visual indication of the beverage level.

In any of the various embodiments discussed herein, a method of indicating a level of a beverage within a beverage container may include determining a current beverage level of the beverage within the beverage container by a beverage-level sensor of the beverage dispenser while the beverage container is being filled, and indicating visually to a consumer the current beverage level of the beverage within the beverage container via a beverage-level indicator as the beverage container is being filled.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
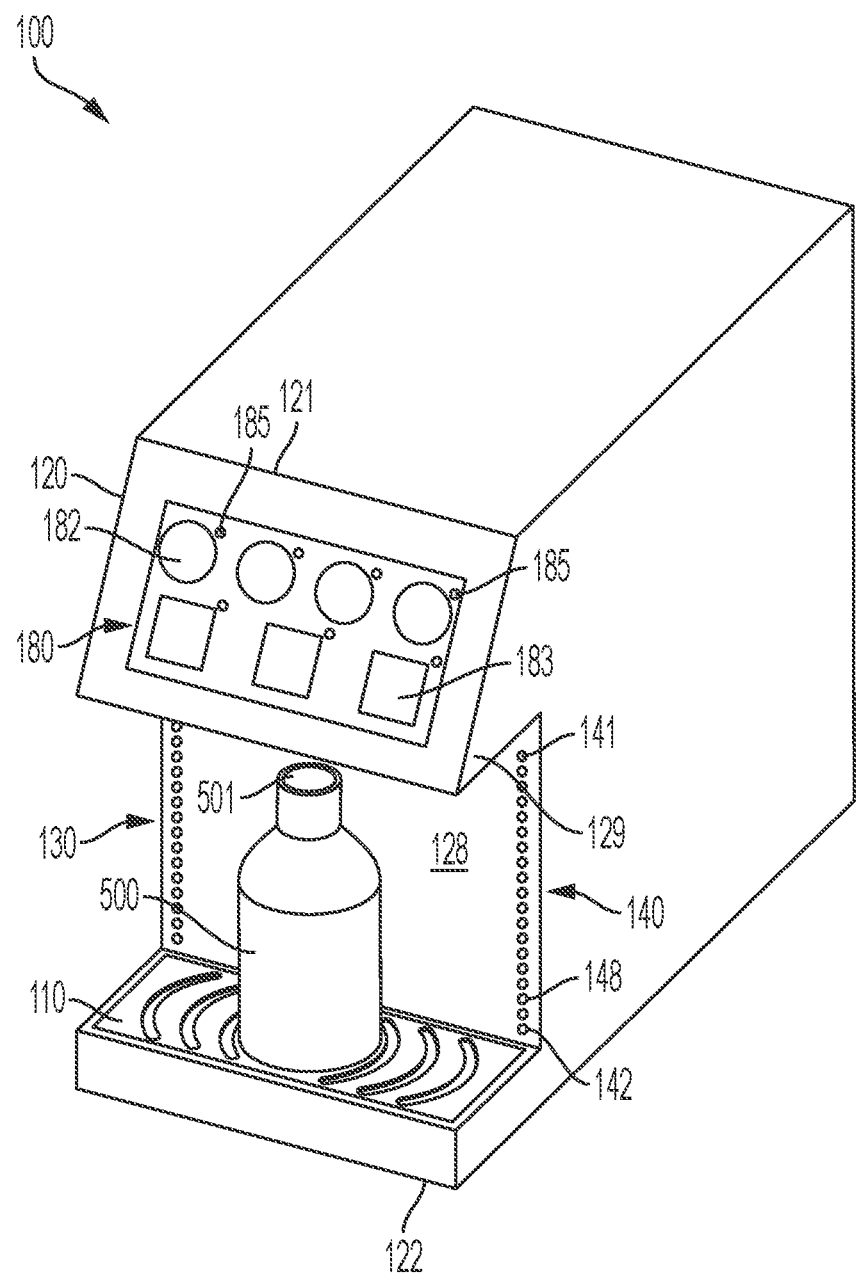
FIG. 1 shows a perspective view of a beverage dispenser having a beverage-level indicator according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Reusable beverage containers may be used to allow a consumer to fill their own reusable beverage container with a beverage. Reusable beverage containers include insulated containers, thermoses, travel mugs, water bottles, sports bottles, and the like. Filling stations for such reusable beverage containers can be found at various locations, such as at restaurants, grocery stores, movie theaters, airports, sports and entertainment venues, among others. While many consumers may prefer to use their own reusable container rather than using a single-use plastic bottle or cup, many reusable beverage containers are opaque, and the level of the beverage within the container cannot be readily determined by the consumer while filling the container. In some cases, even single-use containers may be opaque. The consumer may attempt to peer into the open upper end of the container while the container is being filled, however, the consumer may not be able to precisely determine the beverage level in this manner. Further, the filling station may have a dispensing head for filling the container located on an overhang that is positioned above the beverage container during filling, such that the open upper end is obscured and the consumer is unable to peer into the interior volume of the container.

As a result, the consumer must simply guess or estimate when the beverage container is sufficiently full. The consumer may overfill the container causing a beverage to spill, which can cause the container to become sticky depending on the beverage, and results in a waste of the beverage. Further, the consumer may under-fill the container, and the consumer may need to look into the beverage container after filling the container to check the beverage level, and then, if necessary, return the beverage container to the filling station to further fill the container, which can be time consuming and inconvenient.

Some embodiments described herein relate to a beverage dispenser having a beverage-level indicating system configured to visually indicate to a consumer the beverage level within a beverage container while the beverage container is being filled. The beverage-level indicating system allows a consumer to monitor the fill level of the beverage container as the container is being filled in order to allow the consumer to easily determine when the beverage container has been filled to a desired level.

In some embodiments described herein, a beverage dispenser 100 includes a housing 120 having a dispensing head 160 for dispensing a beverage 550 into a beverage container 500. Beverage dispenser 100 may include a beverage-level indicating system 190 that includes a beverage-level sensor 170 configured to determine a beverage level 503 of a beverage 550 within beverage container 500 during filling of beverage container 500, and a beverage-level indicator 140 that provides an indication, such as a visual indication, to a consumer of a beverage level 503 within container 500. Beverage-level indicating system 190 further includes a control unit 150 that receives information relating to beverage level 503 from beverage-level sensor 170 and causes beverage-level indicator 140 to provide a visual indication of a beverage level 503 within beverage container 500 based on the beverage level information received from beverage-level sensor 170.

Figure 2:
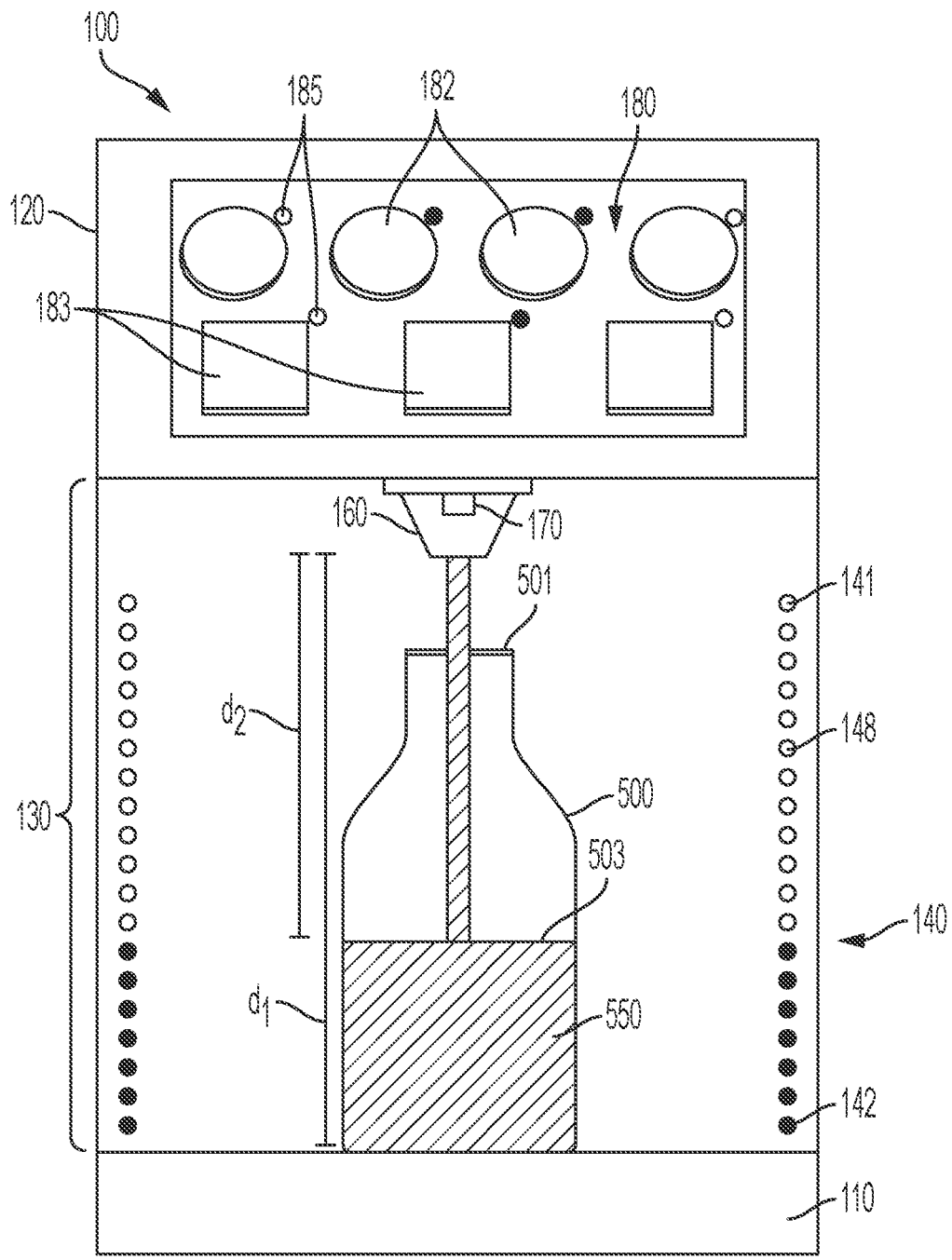
FIG. 2 shows a front view of the beverage dispenser according to FIG. 1.

Some embodiments described herein relate to a beverage dispenser 100, as shown for example at FIGS. 1 and 2. Beverage dispenser 100 includes a housing 120. Housing 120 may enclose components of beverage dispenser 100, and may store one or more beverage ingredients and conduits for supplying the beverage ingredients or base liquid to a dispensing head 160. Beverage dispenser 100 may be configured as a stand-alone, table-top beverage dispenser 100, such that beverage dispenser 100 may be positioned on a table or countertop.

Dispensing head 160 may be positioned on housing 120 at an upper end 121 of housing 120 so as to fill a beverage container 500 positioned under dispensing head 160. Thus, dispensing head 160 may be configured to fill a beverage container 500 in a top-down manner. Dispensing head 160 may be a pre-mix or post-mix dispensing head such that dispensed beverage ingredients are combined before the beverage is dispensed, or are combined when dispensed in beverage container 500, respectively. In some embodiments, beverage dispenser 100 may include a plurality of dispensing heads 160, such as for dispensing various beverages or for filling multiple beverage containers.

A beverage container 500 may be placed in beverage container receiving area 130 of beverage dispenser 100. Beverage container 500 may be a container provided by a consumer, such as a reusable beverage container, e.g., a water bottle. Beverage container receiving area 130 may be an area under dispensing head 160. Dispensing head 160 may be positioned on an overhang 129 of housing 120, as best shown in FIG. 1, such that beverage container receiving area 130 is under overhang 129, allowing a beverage container 500 to be easily positioned under dispensing head 160. Beverage container 500 may be positioned directly beneath dispensing head 160 so that a beverage dispensed by dispensing head 160 enters an open upper end 501 of beverage container 500. In embodiments, beverage container 500 may be single-use (i.e., not reusable).

Further, housing 120 may include a platform 110 on which beverage container 500 can be positioned within beverage container receiving area 130, wherein platform 110 is located below dispensing head 160 at a lower end 122 of housing 120. Thus, in some embodiments, beverage container receiving area 130 may be defined as a space or area between overhang 129 and platform 110. Platform 110 may be a drip tray or the like so as to collect spills and drips from dispensing head 160, as shown in FIG. 1.

In some embodiments, beverage dispenser 100 includes a user interface 180 for receiving a beverage selection of a consumer. User interface 180 may include one or more actuators 182, 183, such as buttons, levers, handles, dials, switches, or the like for receiving a user input. The user input may be a type of beverage or a flavoring, or may be an input for starting dispensing of the selected beverage or beverage ingredients. For example, user interface 180 may include one or more groups of actuators, such as a first group of actuators 183 for selecting a base liquid, such as water, carbonated water, or milk, among others, and a second group of actuators 182 for selecting a beverage flavoring or enhancement, including but not limited to a fruit flavor, such as a lemon-lime flavor, an orange flavor, a cola flavor, or a grape flavor, coffee or tea flavors, chocolate or vanilla flavors, sweeteners, or the like.

In some embodiments, user interface 180 may further include selection indicators 185 that provide visual feedback to a consumer as to which options have been selected. In some embodiments, selection indicator 185 may be a light emitted diode (LED). Thus, each actuator 182, 183 may include a selection indicator 185 in the form of an LED that is initially un-illuminated, and when a consumer actuates a particular actuator 182, the corresponding selection indicator 185 may illuminate so as to notify the consumer that the beverage option has been selected.

Figure 5:
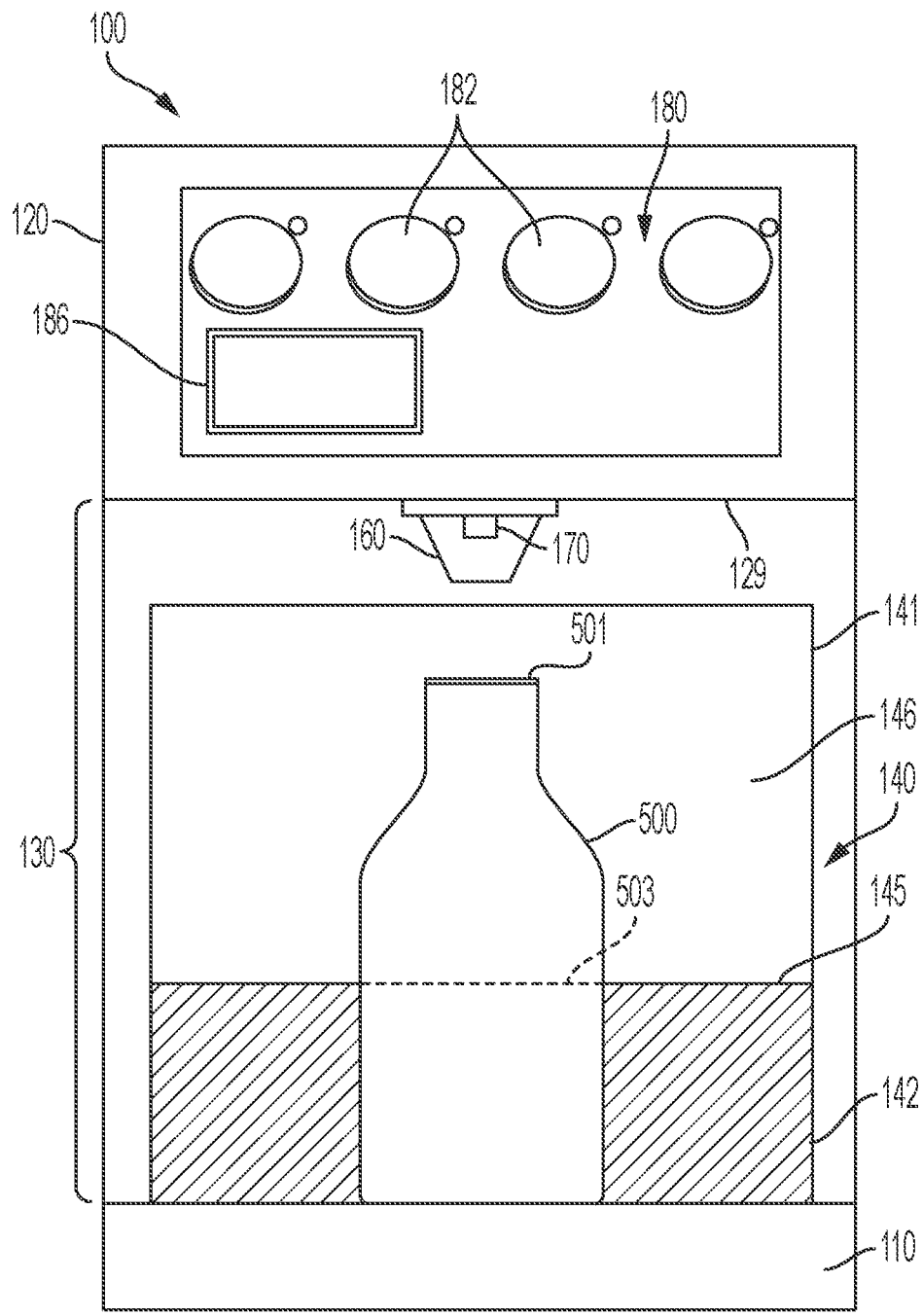
FIG. 5 shows a front view of a beverage dispenser having a digital display according to an embodiment.

In some embodiments, user interface 180 may also include a selection display 186 that displays instructions for selecting and dispensing a beverage, as shown in FIG. 5. Selection display 186 may also display a menu, such as a list of available beverages or available base liquids and flavorings, and the consumer may use the actuators 182 to select among the options shown on selection display 186. Selection display 186 may further serve as a selection indicator 185 by indicating which beverage options have been selected, such as by highlighting the selected options.

Figure 6:
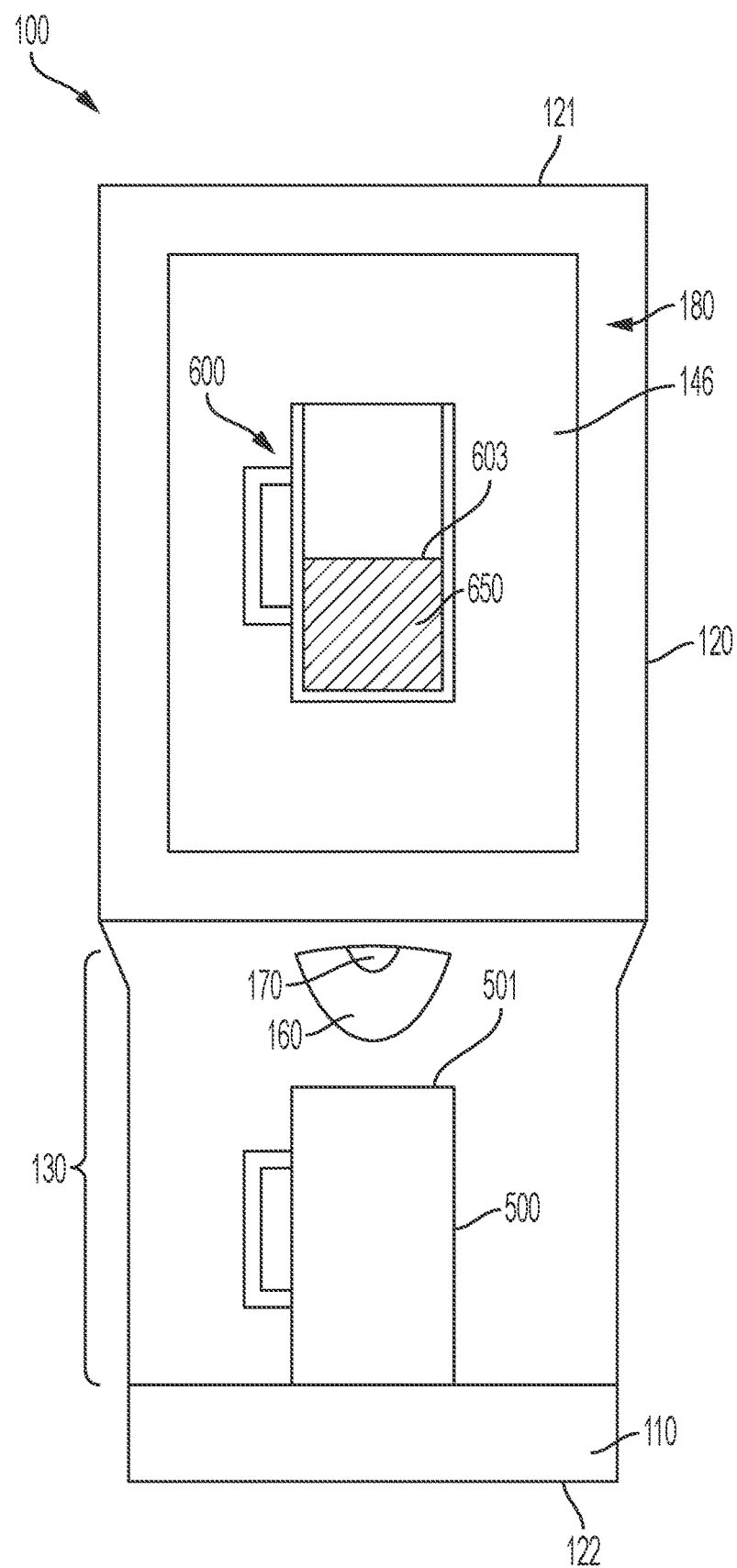
FIG. 6 shows a front view of a beverage dispenser having a touch-screen interface according to an embodiment.

In some embodiments, user interface 180 may be in the form of a touch-screen display 146, as shown in FIG. 6, such that a consumer may make beverage selections by interacting with touch-screen display 146. Touch-screen display 146 may display a graphical user interface that includes icons showing available beverage selections and/or beverage ingredients or flavorings, such that a user may press the touch screen in the area the icon is displayed in order to make a beverage selection. Touch-screen display may similarly indicate which beverage selections have been selected and may display a command for dispensing the selected beverage.

Figure 3:
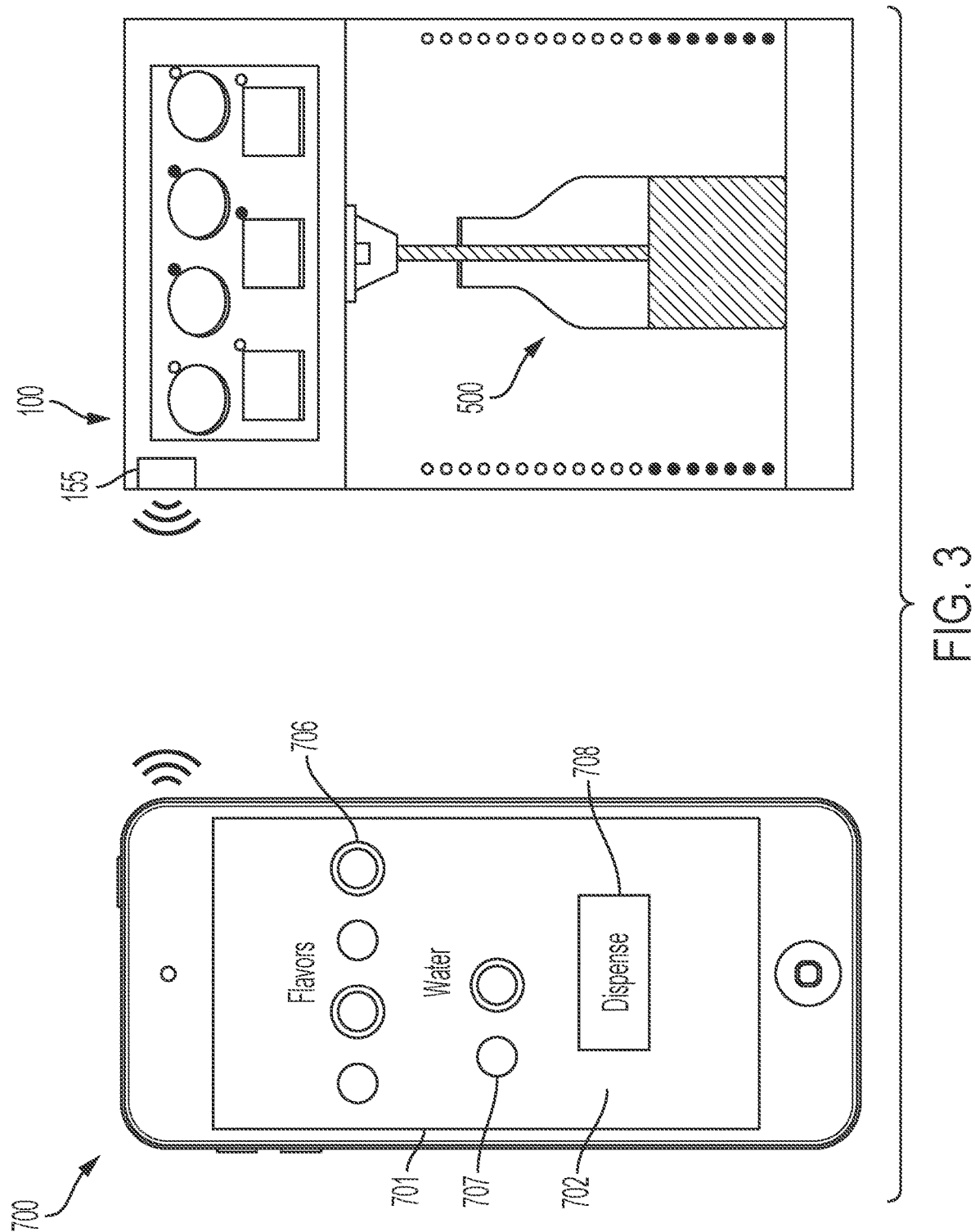
FIG. 3 shows a view of a mobile electronic device used to make a beverage selection according to an embodiment.

In some embodiments, any of the beverage dispensers described herein may be configured to communicate with a mobile electronic device 700, such as a smartphone, laptop, netbook, tablet computer, or the like, as shown for example in FIG. 3. Thus, mobile electronic device 700 may be capable of being placed in wireless communication with a beverage dispenser 100. In some embodiments, mobile electronic device 700 may be used as user interface 180, or mobile electronic device 700 may be in communication with a user interface 180, such that a consumer may select a beverage to be dispensed by beverage dispenser 100 using mobile electronic device 700. Mobile electronic device 700 may be configured to be placed in wireless communication with beverage dispenser 100, such as by Wi-Fi, Bluetooth, or a local area network (LAN) connection, among other types and methods of wireless communication. Mobile electronic device 700 may include a display 701, such as a touch-screen display, and mobile electronic device 700 is capable of executing a software application (i.e., an "app"). Display 701 may display a graphical user interface (GUI) that shows a list of available beverages or beverage flavors 706 and a list of available base liquids 707, such as water or carbonated water, that can be dispensed by beverage dispenser 100. Display 701 may further indicate to the consumer which of the beverage options have been selected by the consumer, and may further display a dispense command 708 for dispensing the selected beverage. Upon selecting the dispense command 708, information relating to the selected beverage may be transmitted by mobile electronic device 700 to beverage dispenser 100, such that the selected beverage is dispensed by beverage dispenser 100.

Figure 4:
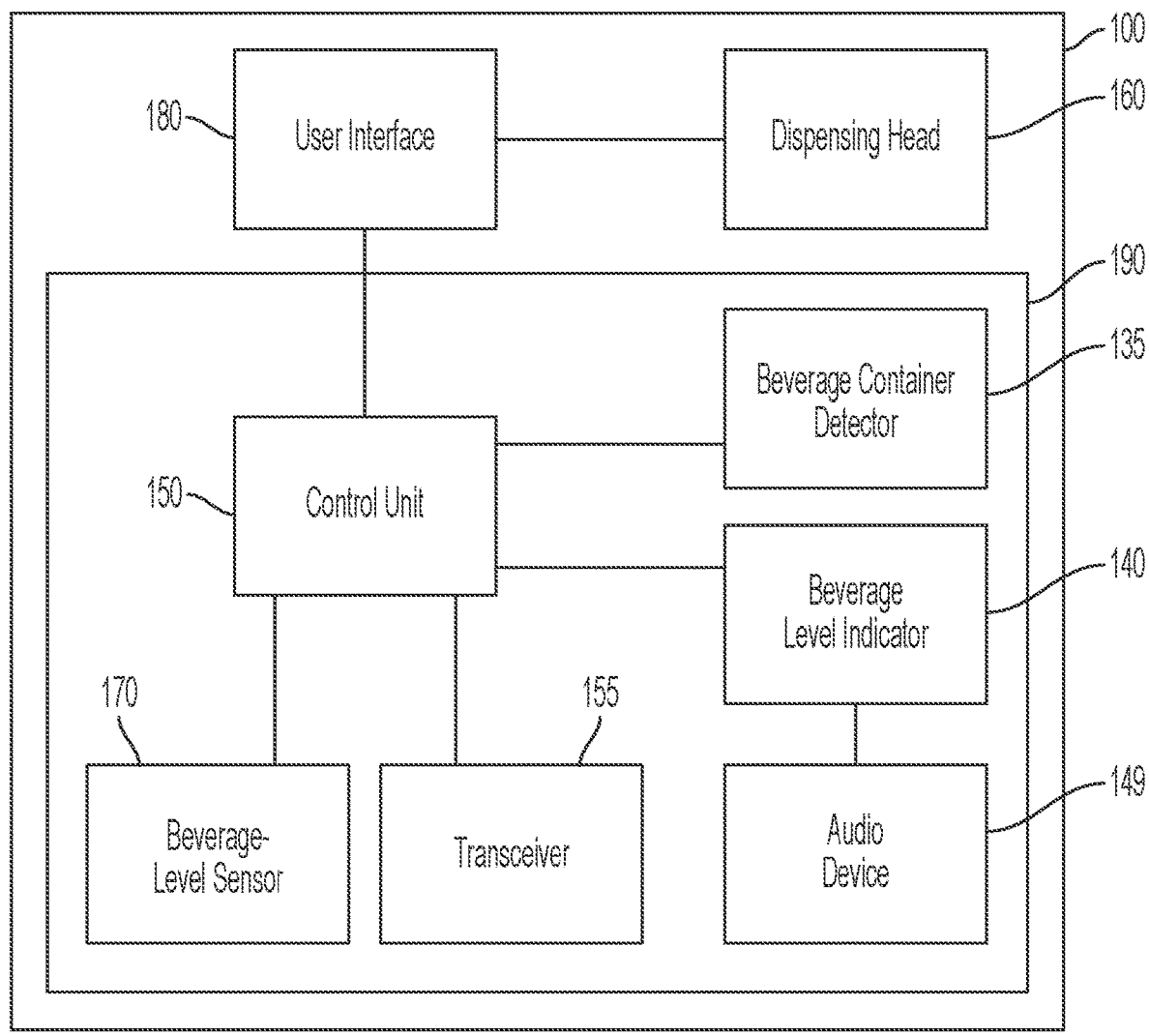
FIG. 4 shows a schematic diagram of components of a beverage dispenser having a beverage-level indicator according to an embodiment.

Beverage dispenser 100 includes a beverage-level indicating system 190, as shown for example at FIG. 4. Beverage-level indicating system 190 includes a control unit 150, a beverage-level sensor 170 for determining a beverage level within a beverage container 500, and a beverage-level indicator 140 configured to provide a visual indication to the consumer of a beverage level 503 within the beverage container 500, such as when beverage container 500 is being filled.

Beverage-level sensor 170 may be arranged on housing 120, such as at an upper end 121 of housing 120. Beverage-level sensor 170 may be arranged on an overhang 129 of housing 120, in embodiments having an overhang 129. Further, beverage-level sensor 170 may be positioned on or adjacent to dispensing head 160. Beverage-level sensor 170 is configured to be oriented in a downward direction toward beverage container 500 positioned in beverage receiving area 130, and toward an interior volume of beverage container 500, such as through open upper end 501 of beverage container 500. In some embodiments, a line can be drawn from sensor 170 to a beverage level 503 within beverage container 500 without contacting a wall of beverage container 500.

Beverage-level sensor 170 may be a non-contact sensor, such that sensor 170 can determine beverage level 503 within the beverage container 500 without physically contacting the beverage 550 within beverage container 500. For example, in some embodiments, beverage-level sensor 170 may be an ultrasonic sensor, an optical sensor, or an acoustic sensor, among others. In some embodiments, multiple beverage-level sensors 170 may be used to determine beverage level 503 within beverage container 500. One of ordinary skill in the art will appreciate that various sensors may be used for detecting a beverage level within a beverage container and can readily select a suitable sensor, and would further appreciate that various methods of determining the beverage level may be used.

For example, in some embodiments, beverage-level sensor 170 may be configured to determine a distance $d_2$ from a beverage level 503 within beverage container 500 to beverage-level sensor 170, as shown in FIG. 2. As beverage container is filled, distance $d_2$ between beverage level and sensor decreases. Beverage-level sensor 170 may also detect a distance $d_1$ from platform 110 or bottom of beverage container 500 (when beverage container is empty). Thus, the beverage level within the beverage container can be determined by the difference of $d_1$ and $d_2$. In some embodiments, beverage-level sensor 170, or a secondary sensor, may be configured to further detect an upper end 501 of beverage container 500, so that beverage-level sensor 170 may determine the fill level 503 relative to the upper end 501 of beverage container 500. In some embodiments, beverage dispenser 100 may be configured to automatically stop filling beverage container 500 when fill level 503 is at or close to upper end 501 of beverage container 500 as determined by beverage-level sensor 170 in order to avoid overfilling beverage container 500.

Beverage-level sensor 170 is configured to determine a fill level 503 of a beverage container 500 regardless of the size, shape, or type of beverage container 500 provided by the consumer. While beverage-level indicating system 190 may be particularly useful when beverage container 500 is opaque, it is understood that beverage container 500 need not be opaque and may be opaque, transparent, translucent, or a combination thereof, and may be composed of any of various materials, including plastic, glass, metal, or ceramic, among others.

Beverage-level sensor 170 may detect an initial fill level of beverage container 500, e.g., prior to using beverage dispenser 100 to fill beverage container 500 with a beverage. Initial fill level may indicate that beverage container is empty, or contains some amount of beverage. During filling of beverage container 500, beverage-level sensor 170 may detect a current fill level within beverage container 500, wherein the current fill level is the instantaneous fill level during filling of beverage container. Beverage-level sensor 170 may continually detect the current fill level of a beverage container 500 in beverage container receiving area 130. In this way, beverage level indicating system 190 is able to provide a real-time determination of beverage level 503 in beverage container 500.

Control unit 150 is configured to coordinate operation of beverage-level indicating system 190. Control unit 150 is configured to receive information relating to a beverage level 503 within beverage container 500 as determined by beverage-level sensor 170. Control unit 150 causes a beverage-level indicator 140 to indicate the beverage level based on the beverage level information received from beverage-level sensor 170 to provide the consumer with an indication of a beverage level 503 within beverage container 500.

In some embodiments, beverage-level indicator 140 of beverage-level indicating system 190 is configured to provide consumers with a visual indication of a beverage level 503 within beverage container 500. The terms "beverage level" or "fill level" refer to the highest level reached by a beverage 550 stored within beverage container 500 in a direction along a longitudinal axis of beverage container 500. Thus, in some embodiments, beverage-level indicator 140 indicates a height of beverage 550 within beverage container 500.

In some embodiments, beverage-level indicator 140 may include lights 148, as shown in FIGS. 1 and 2. Lights 148 may be arranged in a column or a line having a lower end 142 and an upper end 141. Lights 148 may be spaced from one another at a fixed interval. Lights 148 may be arranged in a vertical orientation parallel to or along a longitudinal axis of beverage dispenser and of beverage container 500. In some embodiments, lights 148 may be light-emitting diodes (LEDs). Lights 148 may be arranged on a front surface 128 of housing 120 so as to be easily viewed by a consumer utilizing beverage dispenser 100.

When beverage container 500 is empty as determined by beverage-level sensor 170, no lights 148 are illuminated. As beverage container 500 is filled, lights 148 in the line of lights illuminate sequentially from lower end 142 toward upper end 141 such that at any given time during filling the highest illuminated light 148 indicates the current fill level 503 of a beverage 550 within beverage container 500. Thus, the highest illuminated light 148 on beverage dispenser 100 is coplanar with beverage level 503 within beverage container 500, as shown for example in FIG. 2. As beverage container 500 is filled, lights 148 sequentially illuminate to indicate the fill level 503 of beverage container 500 at any given time. In this way, beverage-level indicator 140 provides a live or "real time" indication of a beverage level 503 within beverage container 500. In some embodiments, rather than illuminating each light 148 from lower end 142 up to a light 148 at the current fill level 503, only a light 148 at the current beverage level 503 is illuminated, such that only one light 148 is illuminated at a time.

In some embodiments, lights 148 may be different colors to indicate how far the user should fill beverage container 500. For example, lights 148 towards upper end 141 of beverage-level indicator 140 may be red, such that when lights 148 having a red color begin to illuminate, the user is alerted that beverage container 500 is likely to be full and thus the consumer should stop filling beverage container 500. In some embodiments, lights 148 may flash to indicate that beverage container 500 is filled to a certain predetermined level at which beverage container 500 is full. For example, lights 148 may begin to flash to when beverage-level sensor 170 detects that a beverage level 503 is within a certain predetermined distance of beverage-level sensor.

In some embodiments, beverage-level indicator 140 may include a digital display that provides a visual indication of a fill level 503 of a beverage 550 in a beverage container 500, as shown for example in FIG. 5. Digital display 146 may be a liquid crystal display (LCD), a light-emitting diode (LED) display, or an organic LED (OLED) display, among others. Display 146 may be positioned on housing 120 of beverage dispenser 100 adjacent to beverage container receiving area 130. Digital display 146 may have a lower end 142 positioned at platform 110 and digital display 146 is positioned facing a consumer and parallel to a longitudinal axis of beverage container 500. Digital display 146 may display a mark 145, such as a line, hash or arrow, at fill level 503 of a beverage 550 within beverage container 500 so as to indicate to a consumer the current fill level 503 of beverage container 500. In other embodiments, digital display 146 may function similarly to lights 148 in that the digital display is progressively illuminated from lower end 142 to the fill level 503, as shown in FIG. 3. Display 146 may depict a liquid, such as water, carbonated water, or soda to provide additional visual interest. Display 146 may be solidly illuminated from lower end 142 of display 146 up to the fill level 503.

In some embodiments, beverage dispenser 100 may include a touch-screen display as the user interface 180, as shown in FIG. 6, and touch-screen display may also serve as beverage-level indicator 140. Touch-screen display may depict a beverage container representation 600, such as an outline of a beverage container that represents the beverage container 500 being filled. The beverage container representation 600 may be shown as being filled with a beverage 650 up to a level 603 that corresponds to beverage level 503 within beverage container 500 being filled by beverage dispenser 100. For example, if beverage level 503 within beverage container 500 is half-full, beverage container representation 600 will also be shown as half-full.

In some embodiments, beverage dispenser 100 may include a beverage container sensor 135 to determine whether a beverage container 500 is positioned within beverage container receiving area 130. In some embodiments, beverage container sensor 135 may be beverage-level sensor 170, or may be a separate sensor, such as a proximity sensor that detects an object within a certain distance of the sensor, or a mass sensor that can detect a weight of a beverage container on platform 110 of housing 120, among various other sensors capable of detecting the presence of a beverage container 500 within beverage container receiving area 130. When a beverage container 500 is detected by beverage-level sensor 170, beverage-level indicator 140 may activate and provide a visual indication of a beverage level 503 within beverage container 500. Thus, beverage level indicating system 190 may indicate a beverage level within a container prior to filling. In some embodiments, however, beverage-level sensor 170 may be configured to activate only when a beverage is actively being dispensed by beverage dispenser 100.

In some embodiments, beverage dispenser 100 may include one or more beverage container sensors 135 for determining the size and dimensions of a beverage container 500 positioned within beverage container receiving area 130. Beverage container sensors 135 may determine the length, width, and height of a beverage container 500. Control unit 150 may receive information from the beverage container sensors 135, and may further be configured to determine a volume of the beverage container 500 based upon the dimensions determined by the beverage container sensor 135. Touch-screen display 146 of beverage dispenser 100 may depict a beverage container representation 600 that is based on the information received from the beverage container sensors 135 so that the beverage container representation 600 more closely corresponds to the beverage container 500 being filled. In this way, the display 146 may be able to more accurately depict the current beverage level 503 within beverage container 500 by beverage container representation 600.

In some embodiments, beverage dispenser 100 does not include a display, such as for use as a user interface or for use as a beverage-level indicator. In such embodiments, user interface 180 may instead include a plurality of actuators, such as buttons, levers, or switches, as described above, and selection indicators, such as LEDs, to indicate the selected options. Further, beverage-level indicator 140 may include lights 148 as discussed above for providing a visual indication of beverage level 503 within beverage container 500. In this way, beverage dispenser 100 can be constructed in a low-cost manner while providing the desired functionality of indicating a beverage level within beverage container.

In some embodiments, beverage-level indicator 140 may provide an audible indication to a consumer. Beverage-level indicating system 190 may further include an audio device 149 configured to emit a tone, sound, or verbal message that indicates fill level 503 of beverage container 500 to a consumer (see FIG. 4). Audio device 149 may include, for example, a memory for storing an audible sound or alert, and a speaker for playing the sound or alert. In some embodiments, audio device 149 may be configured to produce a sound (e.g., a chime or bell) to indicate that beverage container 500 has been filled to a certain predetermined level. Further, in some embodiments, audio device 149 may play a message that announces to the user that beverage container 500 is full, or that beverage container 500 is 25% full, 50% full, or 75% full, etc. Alternatively, audio device 149 may play a series of tones during filling of beverage container, wherein the tones increase in pitch or frequency during filling, such that rapid and/or higher pitched tones indicate the filling of beverage container 500. The use of an audio device 149 to provide an audible indication of a beverage level within a container 500 may be particularly beneficial for alerting vision impaired consumers as to the fill level of their beverage container 500.

Figure 7:
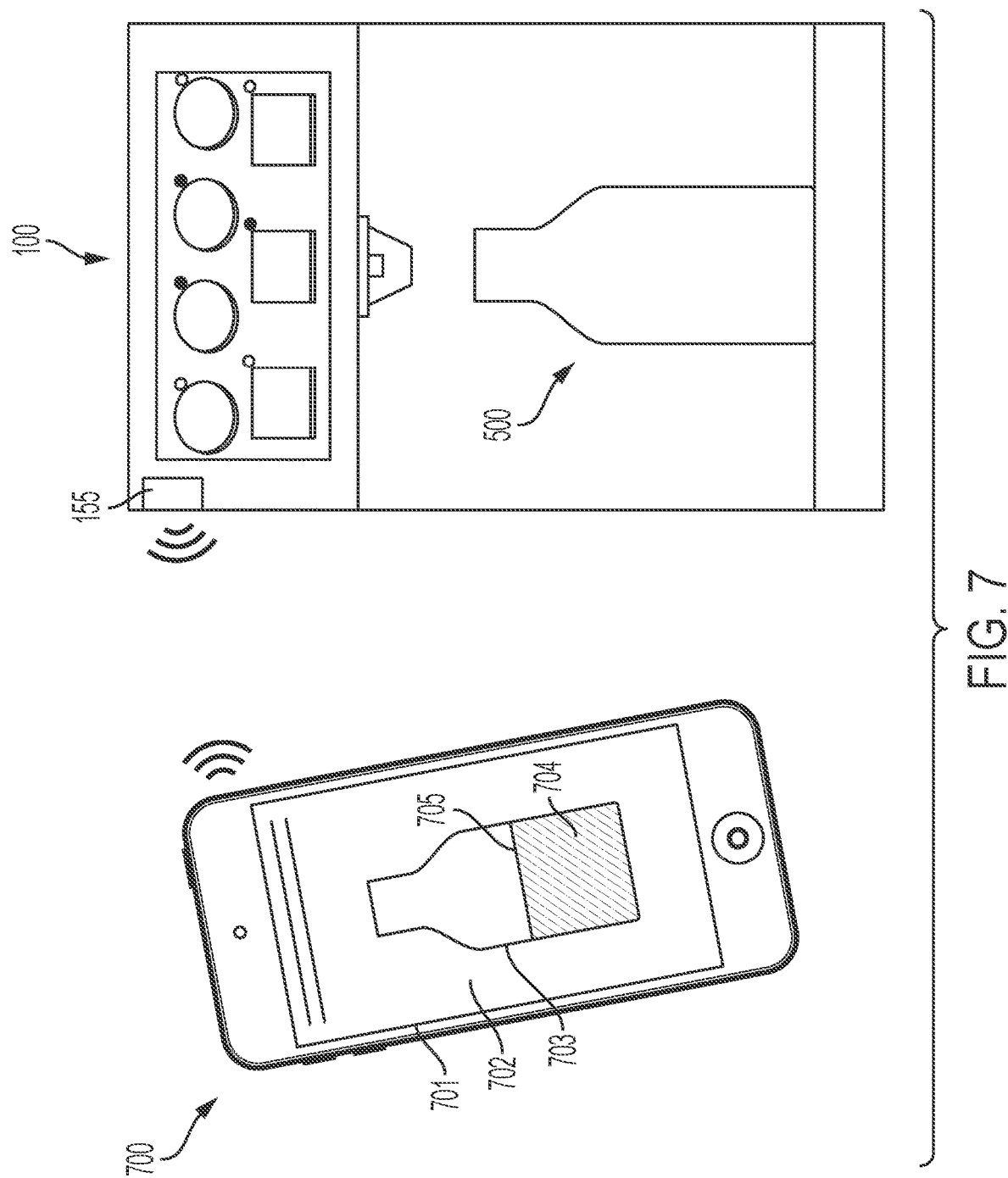
FIG. 7 shows a beverage dispenser in communication with a mobile electronic device according to an embodiment.

In some embodiments, a beverage dispenser 100 as described herein may be configured to transmit an indication of a beverage level 503 of beverage container 500 to a mobile electronic device 700 of a consumer, such as a smartphone, laptop, netbook, tablet computer, or the like, as shown in FIG. 7. Beverage dispenser 100 may include a communication interface, such as a wireless transmitter or transceiver 155, for transmitting a signal to a mobile electronic device 700, and which may also receive a signal from mobile electronic device 700. Mobile electronic device 700 may be configured to be placed in wireless communication with beverage dispenser 100, such as by Wi-Fi, Bluetooth, or a local area network (LAN) connection, among other types and methods of wireless communication. As discussed above with respect to FIG. 3, mobile electronic device 700 may include a display 701 and is configured to execute a software application (i.e., an "app") 702. The software application may display a visual indication of the fill level of the beverage container. For example, mobile electronic device 700 may display a beverage container representation 703, such as an outline of a beverage container, as described above with respect to FIG. 6. Beverage container representation 703 is depicted as being filled 704 (e.g., by displaying a colored or shaded region within an outline of beverage container) to a fill level 705 corresponding to fill level 503 of beverage container 500. Mobile electronic device 700 may be configured to communicate with a beverage dispenser having any of the features as described herein. In embodiments of beverage dispenser 100 having a display (e.g., FIG. 6), the visual indication of the fill level of the beverage container may be displayed on the mobile electronic device 700, on the display of the beverage dispenser, or both.

In some embodiments, mobile electronic device 700 may communicate a size or volume of beverage container 500 to beverage dispenser 100 to facilitate determination of the fill level. For example, using the user interface, a consumer may be prompted to input a size or volume of beverage container 500, e.g., 16 oz., 20 oz., 24 oz., etc., into the software application of mobile electronic device 700, and mobile electronic device 700 may communicate the volume of beverage container 500 to beverage dispenser 100 to facilitate determination of fill level 503 of beverage container 500.

In additional to, or as an alternative to a visual indication, mobile electronic device 700 may be configured to provide other types of indications to the consumer that relate to fill level 503 of beverage container 500, such as audible indications wherein the mobile electronic device 700 serves as audible device 149 described herein, and/or touch or tactile alerts. In some embodiments, mobile electronic device 700 may be configured to vibrate to indicate fill level 503. For example, mobile electronic device 700 may vibrate at an increasing frequency as beverage container 500 is progressively filled. Alternatively, mobile electronic device 700 may vibrate upon fill level 503 of a beverage within beverage container 500 reaching a certain predetermined level. For example, control unit 150 may be configured to transmit a signal to mobile electronic device 700 that causes device 700 to vibrate when a beverage level 503 within beverage container 500 has reached a predetermined beverage level, e.g., when beverage level 503 is within a certain predetermined proximity to beverage-level sensor 170.

In some embodiments, beverage-level indicating system 190 may be separate from a beverage dispenser 100. Beverage-level indicating system 190 may be positioned adjacent to a beverage dispenser 100 such that a consumer can use beverage-level indicating system 190 to indicate a beverage level 503 in beverage container 500, and if beverage container 500 is not sufficiently full, the consumer may then take beverage container 500 to beverage dispenser 100 for filling. Further, in some embodiments, beverage-level indicating system 190 may be independent of a beverage dispenser such that beverage-level indicating system 190 simply indicates to a consumer a current fill level of a beverage within a beverage container 500 independent from a filling operation.

Figure 8:
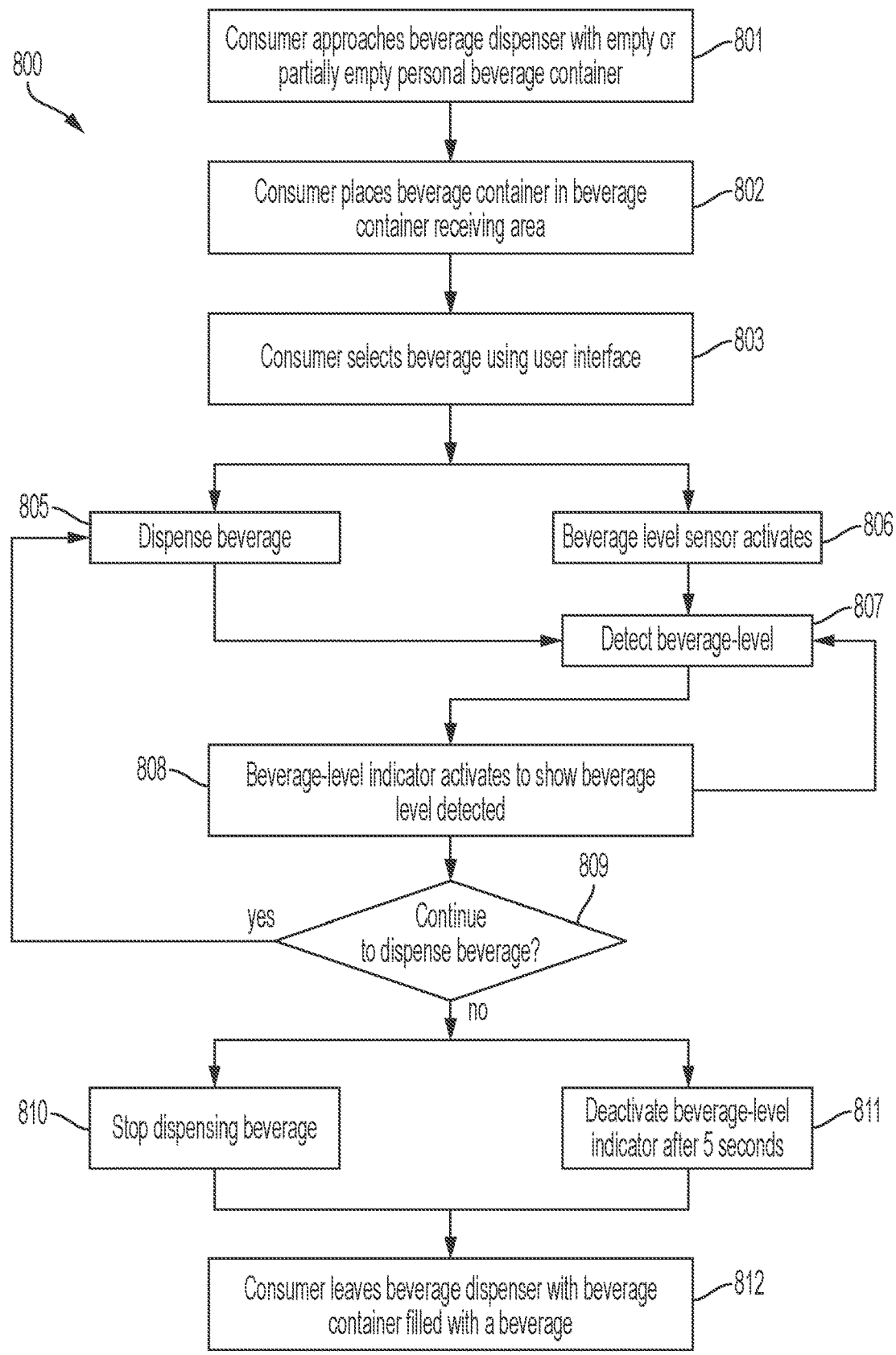
FIG. 8 shows a flow chart of the operation of the beverage dispenser having a beverage-level indicator according to an embodiment.

Some embodiments described herein relate to a method of operating a beverage dispenser that includes a beverage-level indicating system 800, as shown in FIG. 8. A consumer may approach beverage dispenser with a beverage container, such as a reusable beverage container 801. The beverage container may be placed in a beverage container receiving area of the beverage dispenser 802. The consumer may then use the user interface to make one or more beverage selections 803. The selected beverage may be dispensed by operating an actuator of user interface or by selecting a command on touch-screen interface to dispense a beverage, such that the beverage is continually dispensed as long as the actuator or touch-screen is pressed 804. Beverage-level sensor may activate 806 when dispensing button is pressed and as beverage is dispensed 805 into a beverage container in the beverage receiving area. Beverage-level sensor continually detects beverage level within the beverage container during filling. Beverage-level indicator displays the current fill level of the beverage within the container 807 based on the information received from the beverage-level sensor. The beverage-level sensor continues to sense the beverage level and the beverage-level indicator continues to indicate the fill level of the beverage container as long as the beverage is actively being dispensed into the beverage container. However, once the beverage is no longer being dispensed, e.g., when consumer releases dispensing actuator or stops pressing touch-screen, the beverage stops being dispensed 810, and the beverage-level indicator deactivates 811. The beverage-level indicator may remain active for a predetermined period of time after beverage is no longer being dispensed, such as for 5 seconds, or 10 seconds, among other times to provide the consumer with an opportunity to view the final beverage level after the container is filled. The consumer may then remove their filled beverage container 812 from the beverage container receiving area.

In some embodiments, beverage dispenser 100 may be configured to automatically stop dispensing a beverage 550 into beverage container 500 when beverage-level sensor 170 determines that beverage level 503 has reached a predetermined beverage level that corresponds to a state in which the beverage container is full or nearly full. For example, beverage-level sensor 170 or another sensor may detect an upper end 501 of beverage container 500, and beverage dispenser 100 may stop dispensing a beverage when beverage level 503 is at or just below upper end 501 of beverage container 500 as detected by sensor 170. Alternatively, beverage dispenser 100 may automatically stop dispensing a beverage when a beverage level 503 is within a certain predetermined distance of beverage-level sensor 170. The predetermined distance may be estimated based on an average sized beverage container, e.g., if a distance from beverage-level sensor to platform 110 is 12 inches, and an average container is 8 inches in height, beverage dispenser 100 may automatically stop dispensing a beverage when beverage level 503 is within 4 inches (or 4.5 inches to provide a buffer) of beverage-level sensor 170.

Figure 9:
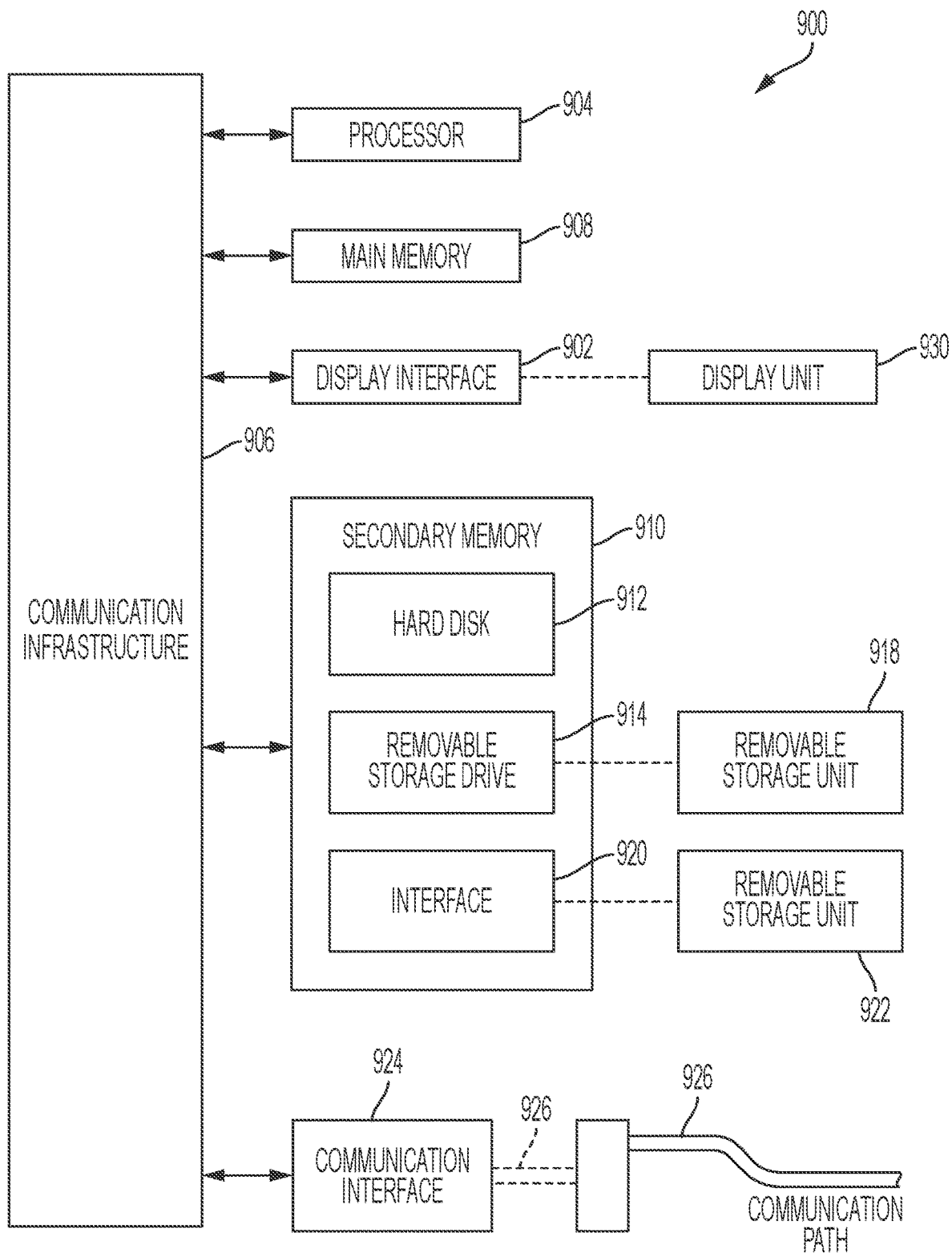
FIG. 9 shows a schematic block diagram of an exemplary computer system in which embodiments may be implemented.

FIG. 9 illustrates an exemplary computer system 900 in which embodiments, or portions thereof, may be implemented as computer-readable code. Control unit 150 as discussed herein may be computer systems having all or some of the components of computer system 900 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 900. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, or removable storage drive 914. Removable storage drive 914 may include a floppy disk drive, a magnetic tape drive, an optical disk drive, a flash memory, or the like. The removable storage drive 914 reads from and/or writes to a removable storage unit 918 in a well-known manner. Removable storage unit 918 may include a floppy disk, magnetic tape, optical disk, a universal serial bus (USB) drive, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communication interface 924. Communication interface 924 allows software and data to be transferred between computer system 900 and external devices. Communication interface 924 may include a modem, a network interface (such as an Ethernet card), a communication port, a PCMCIA slot and card, or the like. Software and data transferred via communication interface 924 may be in the form of signals, which may be electronic, electromagnetic, optical, or other signals capable of being received by communication interface 924. These signals may be provided to communication interface 924 via a communication path 926. Communication path 926 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communication interface 924. Such computer programs, when executed, enable computer system 900 to implement the embodiments as discussed herein. In particular, the computer programs, when executed, enable processor device 904 to implement the processes of the embodiments discussed here. Accordingly, such computer programs represent controllers of the computer system 900. Where the embodiments are implemented using software, the software may be stored in a computer program product and loaded into computer system 900 using removable storage drive 914, interface 920, and hard disk drive 912, or communication interface 924.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A method of indicating a level of a beverage within a beverage container, the method comprising:
    detecting an upper end of the beverage container;
    dispensing a beverage into a beverage container by a dispensing head of a beverage dispenser;
    determining, based on the detected upper end of the beverage container, a beverage level of the beverage within the beverage container by a beverage-level sensor of the beverage dispenser; and
    indicating visually to a consumer the beverage level of the beverage within the beverage container via a beverage-level indicator.

2. The method of claim 1, wherein the beverage-level indicator comprises a plurality of lights arranged in a line that is parallel to a longitudinal axis of the beverage dispenser, and wherein indicating the beverage level comprises illuminating a light of the plurality of lights that is coplanar with the beverage level within the beverage container.

3. The method of claim 1, wherein the beverage-level indicator comprises a digital display, and wherein indicating the beverage level comprises displaying a beverage container representation that is filled to a level that corresponds to the beverage level within the beverage container.

4. The method of claim 1, wherein determining the beverage level comprises determining the beverage level without the beverage-level sensor contacting the beverage within the beverage container.

5. The method of claim 1, further comprising playing a sound by an audio device of the beverage dispenser when the beverage level within the beverage container reaches a predetermined beverage level as determined by the beverage-level sensor.

6. The method of claim 1, wherein indicating the beverage level comprises transmitting a signal corresponding to the beverage level within the beverage container to a mobile electronic device, such that the mobile electronic device displays the visual indication of the beverage level.

7. The method of claim 1, further comprising:
determining a current beverage level of the beverage within the beverage container by a beverage-level sensor of the beverage dispenser while the beverage container is being filled; and
indicating visually to a consumer the current beverage level of the beverage within the beverage container via a beverage-level indicator as the beverage container is being filled.

8. The method of claim 1, wherein the visual indication comprises a real-time indication of the beverage level in the beverage container.

9. The method of claim 1, wherein the visual indication of the beverage level in the beverage container is displayed during dispensing of the beverage.

10. The method of claim 1, further comprising stopping dispensing of the beverage into the beverage container when the beverage level as determined by the beverage-level sensor reaches a predetermined fill level.

11. A method of indicating a level of a beverage within a beverage container, the method comprising:
detecting an upper end of the beverage container;
dispensing a beverage into a beverage container by a dispensing head of a beverage dispenser;
determining, based on the detected upper end of the beverage container, a beverage level of the beverage within the beverage container by a beverage-level sensor of the beverage dispenser;
transmitting a signal representative of the beverage level as determined by the beverage-level sensor to a mobile electronic device in communication with the beverage dispenser; and
providing, by the mobile electronic device, an indication of the beverage level of the beverage within the beverage container based on the signal representative of the beverage level.

12. The method of claim 11, wherein the indication of the beverage level comprises a visual indication.

13. The method of claim 12, wherein the visual indication of the beverage level comprises a representation of a beverage container filled to a level indicative of the beverage level in the beverage container as determined by the beverage-level sensor.

14. The method of claim 11, further comprising providing an audible indication of the beverage level via the mobile electronic device.

15. The method of claim 11, further comprising providing a tactile indication of the beverage level via the mobile electronic device.

16. The method of claim 15, wherein the tactile indication of the beverage level is provided when the beverage level of the beverage within the beverage container reaches a predetermined fill level.

17. The method of claim 11, wherein the indication of the beverage level is provided in real-time.

18. The method of claim 11, wherein the indication of the beverage level is provided during dispensing of the beverage.

19. The method of claim 11, further comprising receiving, by the mobile electronic device, a selection of the beverage to be dispensed by the beverage dispenser.

20. The method of claim 19, further comprising receiving, by the mobile electronic device, a command to dispense the selected beverage.

* * * * *